United States Patent
Conner et al.

(10) Patent No.: US 6,203,847 B1
(45) Date of Patent: *Mar. 20, 2001

(54) COATING OF A DISCRETE SELECTIVE SURFACE OF AN ARTICLE

(75) Inventors: Jeffrey A. Conner, Hamilton; Joseph D. Rigney, Milford; David J. Wortman, Hamilton, all of OH (US); Janet E. Gaewsky, Reading, MA (US)

(73) Assignee: General Electric Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/219,162

(22) Filed: Dec. 22, 1998

(51) Int. Cl.$^7$ ........................................... B05D 1/32
(52) U.S. Cl. ................... 427/142; 427/376.7; 427/376.8; 427/328; 427/405; 29/889.1
(58) Field of Search .................. 427/142, 376.8, 427/376.7, 328, 405; 29/889.1

(56) References Cited

U.S. PATENT DOCUMENTS

| | | | |
|---|---|---|---|
| 3,544,348 | 12/1970 | Boone et al. | |
| 5,167,721 | 12/1992 | McComas et al. | 134/32 |
| 5,254,413 | * 10/1993 | Maricocchi | 428/633 |
| 5,658,614 | * 8/1997 | Basta et al. | 427/253 |
| 5,723,078 | * 3/1998 | Nagaraj et al. | 427/140 |
| 5,897,966 | * 4/1999 | Grossklaus, Jr. et al. | 428/652 |
| 5,915,743 | * 6/1999 | Palma | 29/402.18 |
| 5,972,424 | * 10/1999 | Draghi et al. | 427/142 |
| 6,036,995 | * 3/2000 | Kircher et al. | 427/142 |
| 6,045,863 | * 4/2000 | Olson et al. | 427/253 |

* cited by examiner

Primary Examiner—Shrive Beck
Assistant Examiner—Jennifer Kolb
(74) Attorney, Agent, or Firm—Andrew C. Hess; Gerry S. Gressel

(57) ABSTRACT

A method for restoring or enhancing an environmental resistant coating of a coating total thickness within a coating design thickness range on a metal substrate of an article includes the application of a restoring or enhancing metal to at least one discrete local surface area. Then at least the discrete local surface area is coated with an environmental resistant coating. For use of the method to restore a coating on an article which has experienced service operation and the discrete surface area includes an undesirable amount of oxidation/corrosion products, the oxidation/corrosion products first are removed from an outer portion of the coating while retaining a coating present at the discrete surface areas and retaining the entire coating on surface areas adjacent the discrete surface areas. Then the restoration metal is applied. For use of the method to enhance an existing coating, at least one discrete surface area is selected based on an oxidation/corrosion attack pattern identified from similar articles which experienced service operation in apparatus of a design for which the article is intended. Then the enhancing metal is applied to the selected area.

10 Claims, 4 Drawing Sheets

COATING OF A DISCRETE SELECTIVE SURFACE OF AN ARTICLE

BACKGROUND OF THE INVENTION

This invention relates to the restoration or enhancement of a protective coating on an article, and, more particularly, to the treatment of a local, discrete portion of the coating.

Certain articles, such as components operating in the hotter gas path environment of gas turbine engines are subjected to significant temperature extremes an oxidizing atmosphere and contaminants such as sulfur, sodium, calcium and chlorine which are present in the combustion gases. As a result of service operation in and exposure to such an environment, surfaces of components such as turbine blades and vanes are subject to oxidation/corrosion degradation. To protect the component substrate from excessive environmental attack, surfaces of such components normally are treated with environmentally resistant coatings widely reported in the gas turbine engine art. These environmental coatings generally are classified as diffusion or overlay coatings, distinguished by the processing methods or degree of substrate consumption during deposition.

Reported diffused aluminide coatings, relying on interdiffusion of the applied Al with the Ni from the substrate of a Ni base superalloy to create an intermetallic surface layer, have been applied by a variety of methods including pack cementation, above the pack, vapor phase, chemical vapor deposition and slurry type coating. The thickness and aluminum content of the end product coating can be controlled by varying such coating parameters and materials as the coating source materials, coating time, coating temperature and aluminum activity. For example, such control is reported in a variety of U.S. Patents including 3,544,348—Boone et al. (patented Dec. 1, 1970), and 5,658,614—Basta et al. (patented Aug. 19, 1997). The oxidation and corrosion resistant performance of diffused aluminide coatings has been shown to be enhanced by incorporating Pt, Rh and/or Pd. To incorporate these elements, thin layers of such elements generally are deposited by electroplating or physical vapor deposition means, prior to the aluminide coating cycle.

One type of overlay coating, applied for oxidation and corrosion protection of Ni base superalloy articles, includes Ni and Al along with one or more other elements such as Cr, Ta, Hf, Y and others. These coatings have been applied by deposition techniques including plasma spray, sputtering, electron beam, physical vapor deposition, among others. These processes sometimes are followed by diffusion aluminiding processes that enhance the environmental protection of the system. During heat treatments and/or service operation of the article such as in a gas turbine engine, such overlay coatings can diffuse into the substrate, consuming a portion of a load bearing wall such as the wall of a turbine blade airfoil.

Although oxidation/corrosion degradation or interdiffusion loss of original coating composition that occurs during engine service operation varies in intensity across surfaces of a turbine airfoil with some surfaces experiencing very little attack or composition loss, a current repair practice includes the complete removal from all coated surfaces of the protective diffused coatings or overlay coatings prior to repair. Such complete removal results in loss of wall thickness, from removal of the interdiffused region, which reduces component load bearing capability. Additionally, complete coating removal creates problems with maintenance of designed cooling air flow patterns and flow rates for air cooled components at points at which cooling holes, communicating with internal cooling passages, intersect the component outer surface from which the coating has been removed and must be replaced for component reuse.

BRIEF SUMMARY OF THE INVENTION

The present invention, in one form, provides a method for restoring an environmental resistant coating, having a coating total thickness within a coating design thickness range, on a metal substrate of an article which has experienced service operation, the coating having an outer portion and an inner portion diffused with the metal substrate, for example, during original coating manufacture and/or after subsequent service operation. The outer portion has at least one discrete local surface area including an undesirable amount of oxidation/corrosion products resulting from exposure to service operation. The method comprises selectively removing the oxidation/corrosion products at least from the discrete surface area of the outer portion while retaining any coating inner portion (where present) at the discrete surface area, and retaining the coating inner and outer portions on surface areas adjacent the discrete surface area. Then at least the discrete surface area is coated with a protective coating selected from aluminides and alloys including aluminum using coating parameters selected to maintain the coating total thickness substantially within the coating design thickness range.

In another form, the present invention provides a method for enhancing an existing environmental resistant coating on an article, the coating being of a coating total thickness within a coating design thickness range. The method comprises selecting at least one discrete local surface area of the coating more subject to oxidation/corrosion during service operation. Then at least the discrete surface area is coated with a protective coating selected from aluminides and alloys including aluminum using coating parameters selected to maintain the coating total thickness substantially within the coating design thickness range.

DETAILED DESCRIPTION OF THE INVENTION

Figure 1:
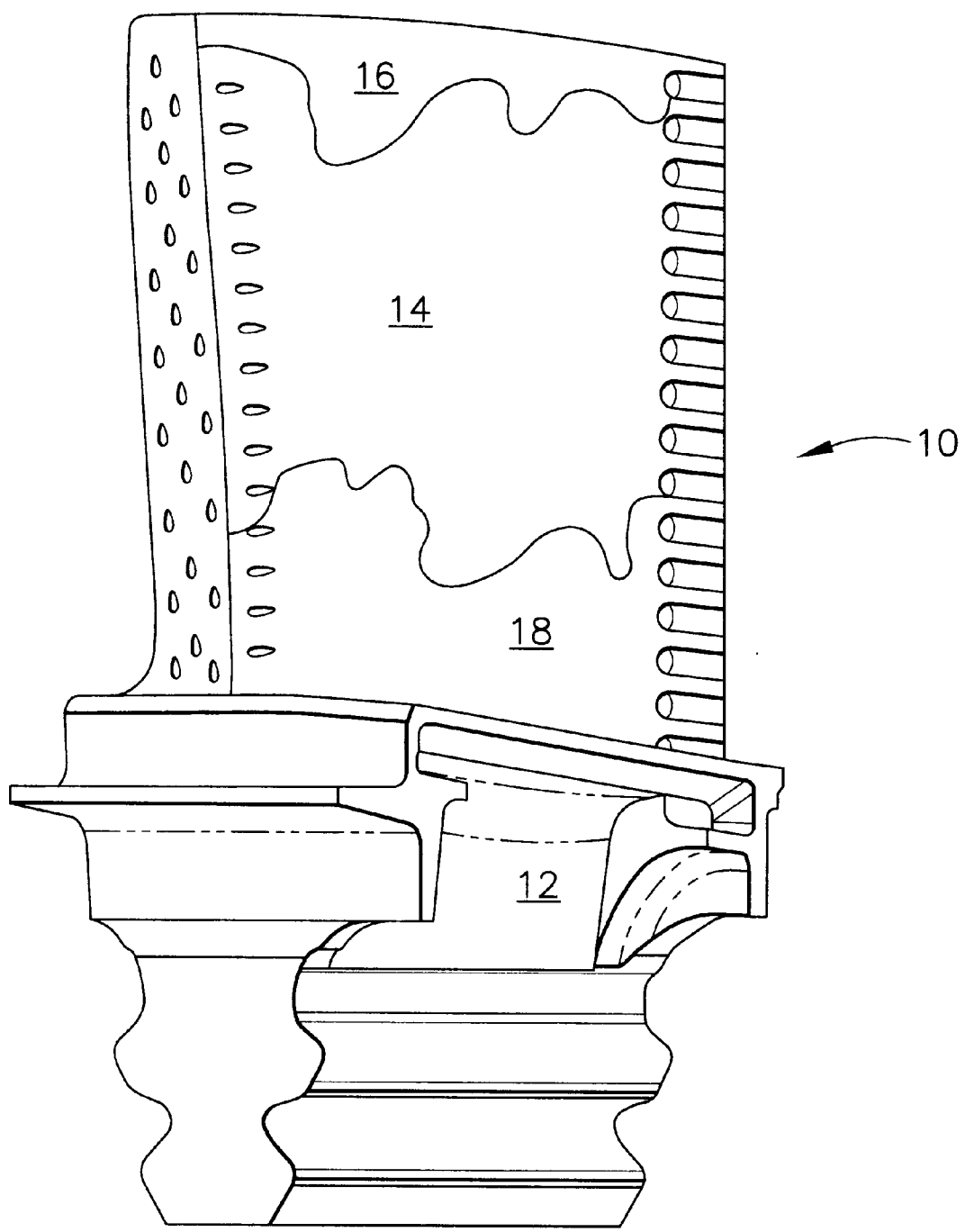
FIG. 1 is a perspective, diagrammatic view of a gas turbine engine blade from the concave side showing discrete, local coating surface areas of heavier oxidation/corrosion resulting from service operation.
Figure 2:
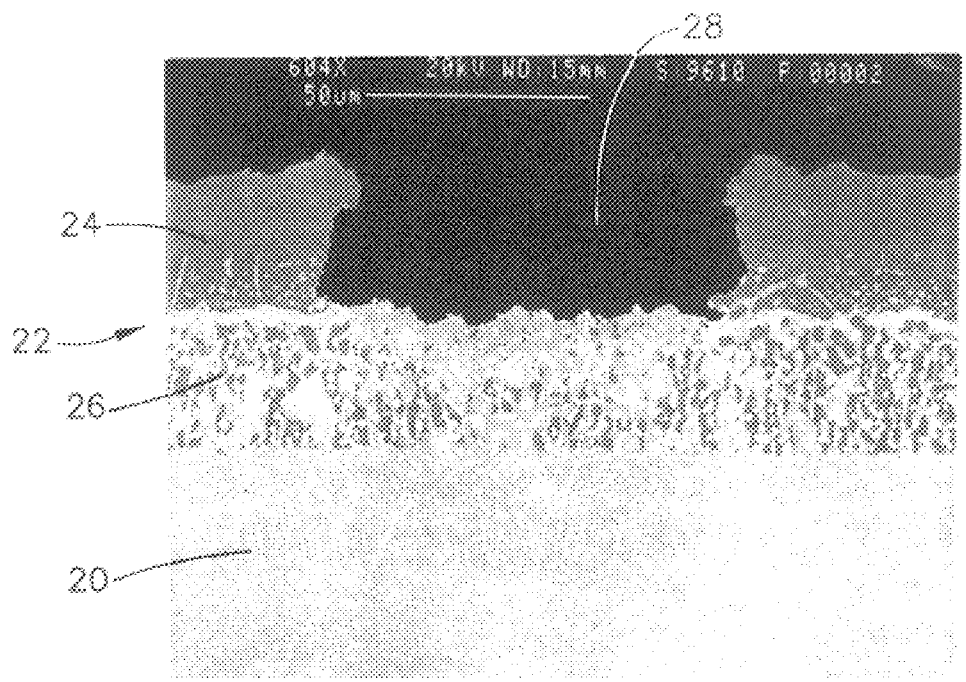
FIG. 2 is photomicrographic sectional view including a portion of an environmental resistant coating portion from which oxidation/corrosion product has been removed.
Figure 3:
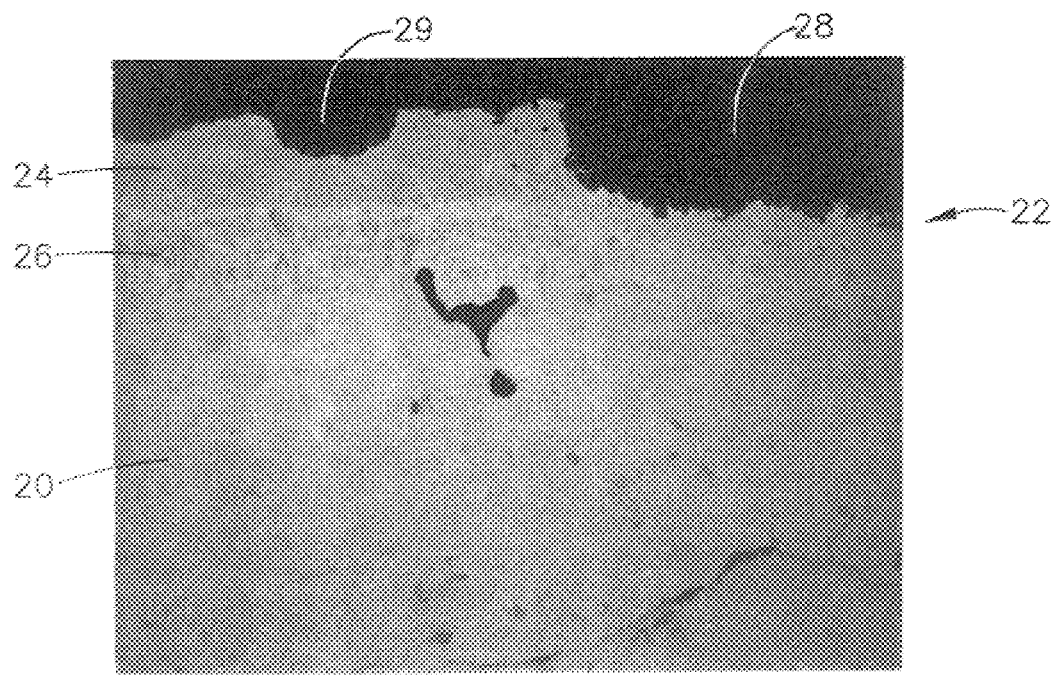
FIG. 3 is a photomicrographic sectional view as in FIG. 2 showing, in addition, a pocket within a coating additive layer from which corrosion has been removed.

Each specific design of gas turbine engine turbine blade has its own unique environmental "attack pattern" of more severe oxidation/corrosion of a protective coating occurring during service operation in an engine for which it has been designed. One such attack pattern of selective, discrete surface areas of undesirable oxidation/corrosion is shown in the perspective, diagrammatic view of FIG. 1. In FIG. 1, a gas turbine engine turbine blade for use in a high pressure turbine, shown from its concave side generally at 10, comprises a base 12 and an airfoil 14 which includes thereon an environmental resistant coating, one form of which is shown in the photomicrographs of FIGS. 2 and 3. Forms of the environmental resistant coating include an aluminide coating as well as an overlay coating of an alloy including Al. For example, widely reported overlay coatings used in the gas turbine engine art are the MCrAl or MCrAlY type of overlay coating in which M is at least one element selected from Fe, Ni, and Co, and Y represents any oxygen active element. Shown on the concave side of the blade, on which a major portion of such attack generally occurs to a turbine blade, are discrete local coating surface areas 16 and 18 which have been degraded during engine service operation to define an environmental attack pattern for that particular blade design.

When attack in a discrete area exceeds specified limits, removal of the oxidation/corrosion is required and reapplication of the coating must be conducted before the article can be returned to service operation. Current state of the art practice includes removal of the entire surface coating, not just from the undesirably degraded portions, and subsequent coating reapplication on all surfaces, not just the attacked areas, without control of wall thickness in respect to design limits. Typical design total coating thickness limits for aircraft engine turbine blades are in the range of about 1–5 mils for diffusion aluminides and about 1–10 mils for the overlay coatings. As was discussed above, complete removal of the coating can result in detrimental wall thinning and/or problems relating to cooling hole openings in the article surface. Overcoating of an entire surface without control of coating total thickness can result in significant increase in such thickness beyond design limits. Not only can such increase in coating total thickness disrupt airflow patterns across a blade, but also it can adversely affect mechanical properties of the article.

Figure 4:
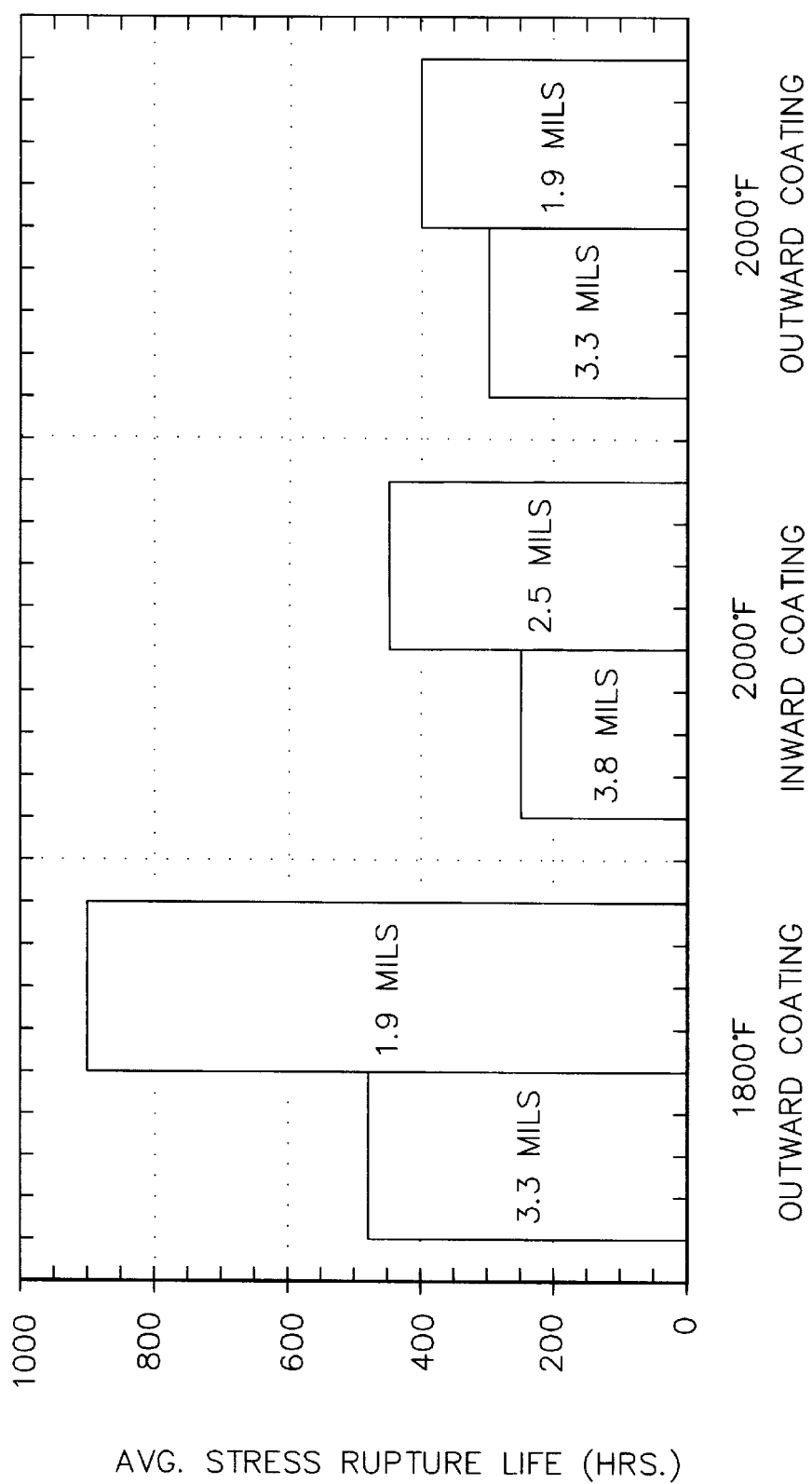
FIG. 4 is a graph showing the effect of coating thickness on average stress rupture life of a Ni base superalloy single crystal material.

Numerous existing mechanical property data bases show a strong correlation between coating thickness and key mechanical properties, such as stress rupture strength, high cycle fatigue resistance, etc. Substantial decreases in mechanical properties can occur as coating thickness increases, especially on advanced nickel base superalloys where rapid interdiffusion occurs between the substrate and the coating, due to high refractory element content of such alloys. Additionally, thicker coatings are more prone to craze cracking than thinner coatings during thermal transients experienced during engine operation. Therefore, total coating thickness is selected for a particular design of article such as a turbine blade to be within a design thickness range not only for airflow considerations but also to maintain desired mechanical properties for the article during operation. Typical of such data showing one relationship of coating thickness to mechanical properties and that properties can be reduced with increasing thickness are the data included in the graph of FIG. 4 showing the effect of coating thickness on the average stress rupture life of a commercially used Ni base superalloy single crystal material. The coating was a commercially used Pt-Al type of coating.

In FIG. 4, "inward" and "outward" refer to the predominant diffusion direction during coating formation. Inward diffusion indicates that the coating is formed primarily by diffusion of aluminum into the substrate surface with limited outward diffusion of nickel (i.e. low temperature combined with high aluminum activity). Outward diffusion indicates that the coating is formed by outward diffusion of nickel along with inward diffusion of aluminum (i.e. high temperature combined with lower aluminum activity).

The present invention provides a method for the restoration or enhancement of environmental resistance to a coating on an article while maintaining article design limits and substantially avoiding reduction in mechanical properties associated with increase in coating thickness. For service operated coated articles, this is accomplished by the selective removal from discrete, local surface areas of excessive oxidation/corrosion products from the outer portion of a coating without removing the inner portion of the coating, where present. The coating on surface areas adjacent the selective discrete areas are retained during such removal of the undesirable products, and an inner portion of the coating on the article substrate at the local, discrete areas may be retained as well. Removal of oxidation/corrosion products can be achieved by either mechanical or chemical means generally used in the art for such purposes. If the removal process is mechanical, masking of adjacent surfaces generally is required. If the removal process is chemical, masking of adjacent surfaces generally is not required since regions without oxidation/corrosion products are not affected by the chemicals ordinarily used.

The photomicrographs of FIGS. 2 and 3 show one practice of that portion of the present invention. In FIGS. 2 and 3, the article substrate 20 was a commercially used Ni base superalloy sometimes referred to as Rene' 125 material and on which had been applied a commercially available CODEP aluminide coating shown generally at 22. Coating 22 included an outer portion 24 and an inner portion 26 diffused with substrate 20 in a manner well known in the art. During gas turbine engine service operation, discrete, local areas at 28 and 29 of the coating outer portion 24 experienced excessive oxidation/corrosion, with the area at 28 to a greater depth than the pocket area at 29. For practice of one form of the method of the present invention, such oxidation/corrosion was removed selectively from the discrete locations at 28 and 29 by chemical means, retaining the balance of the coating outer portion 24 at location 29, coating inner portion 26 beneath location 28 and retaining the complete coating 22 on areas adjacent discrete locations 28 and 29. If the selective, discrete surface areas from which oxidation/corrosion is to be removed includes such surface features as openings or indentations for the discharge of cooling air, such features can be masked if mechanical removal means are used to avoid changing airflow patterns of such features.

Figure 5:
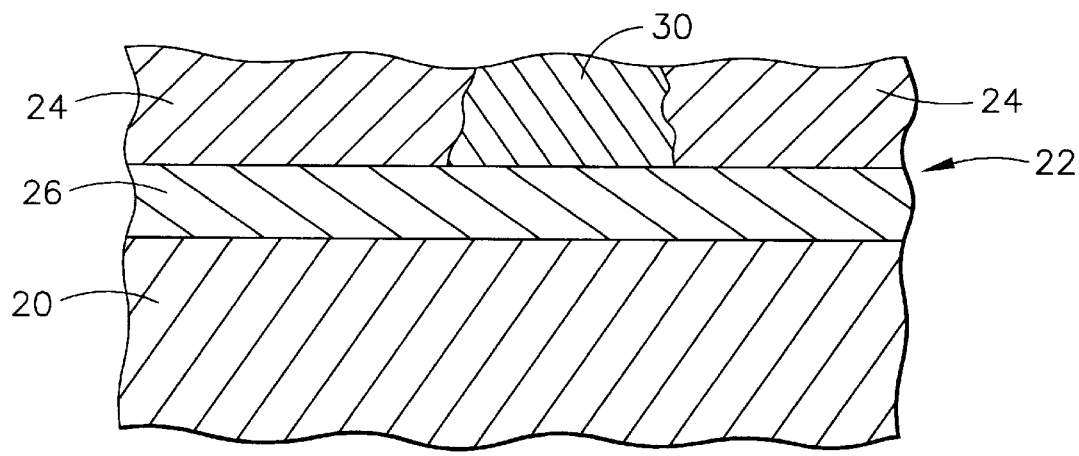
FIG. 5 is a diagrammatic sectional view as in FIG. 2 showing deposition of a restoration metal at the position of product removal.

After the selective removal of the oxidation/corrosion from locations 28 and 29, coating surface areas adjacent locations 28 and 29 were masked and a restoration metal, such as Pt, Rh, and/or Pd, was deposited selectively in the void at locations 28 and 29. The restoration metal, which in this example was Pt, was deposited to a thickness which, when the metal is diffused with inner coating portion 26, will be within a coating design thickness range of the original coating. As was stated above, generally for gas turbine engine high pressure turbine blades the coating design thickness for overlay coatings such as the MCrAl type coating is in the range of about 1–10 mils and for diffusion aluminides is in the range of about 1–5 mils. Accordingly, deposited Pt thickness typically is in the range of about 2.5–10 microns for such gas turbine engine blade applications. As is well known and reported in the art, conveniently such element as Pt can be applied by electrodeposition. However, alternatively the restoration metals can be applied by ther methods including spraying, sputtering, etc. Resulting from the deposition of Pt in this example is the structure shown in the diagrammatic sectional view of FIG. 5 in which Pt 30 was electrodeposited selectively in the discrete void at location 28.

After deposition of the restoration metal 30 selectively in discrete locations 28 and 29, the masking was removed from the outer surface and the restoration metal was heated to diffuse the metal into the inner portion 26. Typically for a Pt deposit, the heat treatment was in the range of about 900–1150° C. for a time, for example 0.5–4 hours, sufficient to diffuse the restoration metal into the underlying portion. Heat treatment at this point in the method, before subsequent aluminiding, eliminates the need for extended high temperature exposure during the aluminide cycle which in certain known methods is practiced to accomplish both Pt diffusion and aluminiding at the same time. Also, it provides significant flexibility in the selection of the aluminiding process and parameters for the aluminiding of the surface substantially without increase in coating total thickness beyond the coating design thickness, according to the present invention.

Figure 6:
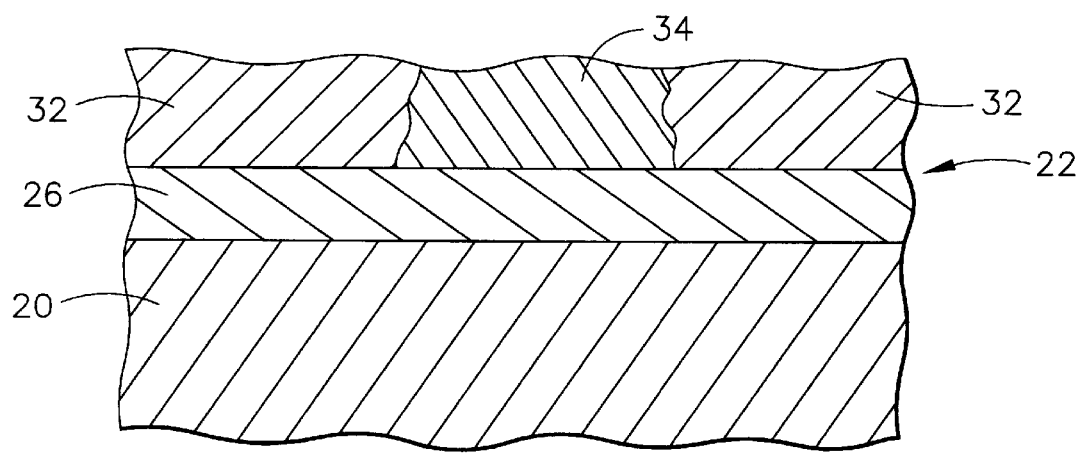
FIG. 6 is a diagrammatic sectional view as in FIG. 4, including aluminiding of the outer portions.

Following diffusion heat treatment of the restoration metal, in this example the entire outer surface was aluminided, including the Pt treated selective discrete areas as well as the other adjacent surfaces of the article. The aluminiding used coating parameters which were selected to produce a Pt-Al coating portion on the selective discrete surface areas and an aluminum enriched surface on adjacent areas, without substantial increase in thickness in such adjacent areas, and while maintaining the coating total thickness within the coating design thickness range. One example of the resulting coating according to the present invention is shown in the diagrammatic sectional view of FIG. 6, showing the Pt-Al coating 34 at the selective discrete area previously identified as location 28 and the new, aluminum enhanced outer coating portion 32, without substantial increase in coating thickness, within the coating design thickness range.

During evaluation of the present invention, a gas turbine engine air cooled high pressure turbine blade which had experienced engine operation service was inspected for oxidation/corrosion degradation on the airfoil surface. The blade was manufactured from a commercially used Ni base superalloy sometimes referred to as Rene' 125 alloy and included on the airfoil an aluminide coating commercially available as CODEP aluminide coating. The coating design thickness range for this article was 1–4 mils and the coating total thickness for the turbine blade as manufactured was in the range of about 2–3 mils. The inspection disclosed discrete local surface areas of oxidation/corrosion in an attack pattern on the airfoil similar to that shown in FIG. 1 and to an extent requiring repair before the blade could be returned to operation service.

The surface of the airfoil was cleaned using a chemical cleaning process to remove superficial surface contaminants and to remove the oxidation/corrosion products identified in the attack pattern on the airfoil outer portion in the discrete, local areas. The balance of the coating was retained, generally as shown in FIGS. 2 and 3. Retained as well was the complete coating on airfoil surfaces adjacent the selective, discrete surfaces.

The coating surface areas outside of the attack pattern were masked with standard electroplater's lacquer. Then the discrete, local areas from which oxidation and corrosion was removed were electroplated with Pt to a thickness of about 2.5 microns. The masking was removed and the Pt thus deposited was heated in a non-oxidizing atmosphere at a temperature of about 1050° C. for about 2 hours to diffuse the Pt into the underlying inner portion of the original coating. This resulted in a structure similar to that shown in FIG. 5.

After such diffusion heat treatment of the Pt deposit, the entire surface of the airfoil was aluminided using a commercial vapor phase (above the pack) type of aluminide coating process. The coating resulting from the practice of the present invention, as represented by this example, had a coating total thickness within the coating design thickness range while providing the blade with improved resistance to oxidation and corrosion.

As was mentioned above, another form of the present invention comprises practice of the above described method for Pt-Al coating application at selective, discrete local surface areas of a coated, substantially unused, new article, one example of which is a blade, to enhance its resistance to oxidation and corrosion. Application of the Pt-Al coating at the discrete areas is based on an attack pattern identified from similar articles which had experienced service operation in apparatus of the design for which the new article is intended.

This invention provides a method for restoring or enhancing the environmental resistance of coatings exposed to service operation, such as in the gas path environment of gas turbine engines, with coating application at discrete, local areas to match actual needs for such environmental improvement. This is accomplished without complete removal of inner portions of a degraded coating or removal of coating from adjacent coated surfaces. Such selective, discrete coating reduces the required amount of such expensive metals as Pt. At the same time, it provides the capability to avoid damage to or change in article surface characteristics, for example airflow characteristics at such blade features as air cooling holes or surface indentations as well as edge portions which can affect aerodynamic performance.

The present invention has been described in connection with specific examples and embodiments which are intended to be typical of rather than in any way limiting on the scope of the present invention. Those skilled in the arts associated with this invention will understand that it is capable of variations and modifications without departing from the scope of the appended claims. For example, the oxidation/corrosion attack pattern will vary with each article design and removal of degraded surfaces can be accomplished by a variety of published processes while retaining the coating and coating portions as described above. Also, the application of restoration or enhancing metal, as well as the aluminiding application, can be accomplished by a variety of known processes, provided that the thickness considerations and limitations of the present method are fulfilled.

What is claimed is:

1. A method for restoring an environmental resistant coating of a coating total thickness within a coating design thickness range on a metal substrate of an article which has experienced service operation, the coating having an outer portion and an inner portion diffused with the metal substrate, the outer portion having at least one discrete local surface area on which are an undesirable amount of oxidation/corrosion products resulting from exposure to service operation, comprising the steps of:

removing the oxidation/corrosion products at least from the discrete surface area of the outer portion while retaining any coating present at the discrete surface area and retaining the coating inner and outer portions on surface areas adjacent the discrete surface area; and then, applying an environmental resistant coating selected from the group consisting of aluminides and alloys including aluminum to at least the discrete surface area to fill the entire discrete surface area with said coating to a thickness substantially within the coating design thickness range.

2. The method of claim 1 in which, prior to applying the enviromental resistant coating selected from the aroup consisting of aluminides and alloys including aluminum, at least the discrete surface area is coated with at least one restoration metal selected from the group consisting of Pt, Rh, and Pd to a thickness which when diffused with the coating inner portion will be within the coating design range and will be a part of the environmental resistant coating.

3. The method of claim 2 in which the restoration metal is heated at a temperature and for a time sufficient to diffuse the restoration metal into the coating inner portion.

4. The method of claim 1 in which the applied environment resistant coating includes the entire outer portion.

5. The method of claim 3 in which:
    the article is a gas turbine engine blade including an airfoil surface;
    the substrate is a Ni base superalloy;
    the discrete local surface area is on the airfoil surface;
    the coating design thickness range is about 1–10 mils;
    the coating total thickness range is about 1–10 mils;
    the restoration metal is Pt applied to a thickness in the range of about 1–10 microns; and,
    the restoration metal is heated within the range of about 900–1150° C. for about 0.5–4 hours.

6. A method for enhancing an existing environmental resistant coating on a metal substrate of an article, comprising the steps of:
    selecting at least one discrete local surface area of the coating more subject to undesirable oxidation/corrosion during service operation, based on an oxidation/corrosion attack pattern identified from similar articles which had experienced service operation in apparatus of a design for which the article is intended;
    masking surface areas of the coating adjacent the discrete surface area, leaving the discrete surface area exposed; and then,
    applying an environmental resistant coating selected from the group consisting of aluminides and alloys including aluminum to at least the discrete surface area using coating parameters selected to substantially avoid significant increase in coating thickness.

7. The method of claim 6 in which, prior to applying the environmental resistant coating selected from the group consisting of aluminides and alloys including aluminum, at least the discrete surface area is coated with at least one enhancing metal selected from the group consisting of Pt, Rh, and Pd which will be a part of the applied environmental resistant coating.

8. The method of claim 7 in which the enhancing metal is heated at a temperature and for a time sufficient to diffuse the enhancing metal into the existing coating.

9. The method of claim 6 in which the applied environmental resistant coating includes the entire coating.

10. The method of claim 8 in which:
    the article is a gas turbine engine blade including an airfoil surface;
    the substrate is a Ni base superalloy;
    the discrete local surface area is on the airfoil surface;
    the coating design thickness range is about 1–10 mils;
    the enhancing metal is Pt applied to a thickness in the range of about 1–10 microns; and,
    the enhancing metal is heated within the range of about 900–1150° C. for about 0.5–4 hours.

* * * * *